United States Patent [19]
Faulkner

[11] Patent Number: 5,413,211
[45] Date of Patent: May 9, 1995

[54] CONVEYOR INCOPORATING CURVED SURFACE FLIGHT LINKS

[75] Inventor: William G. Faulkner, Oklahoma City, Okla.

[73] Assignees: William Faulkner; Marie-Francoise Bigot Faulkner, both of Oklahoma City, Okla.

[21] Appl. No.: 289,959

[22] Filed: Aug. 12, 1994

Related U.S. Application Data

[60] Continuation of Ser. No. 117,566, Sep. 3, 1993, abandoned, which is a continuation of Ser. No. 982,816, Nov. 30, 1992, abandoned, which is a continuation of Ser. No. 660,977, Feb. 26, 1991, abandoned, which is a division of Ser. No. 366,773, Jun. 19, 1989, Pat. No. 5,020,656, which is a continuation-in-part of Ser. No. 220,601, Jul. 18, 1988, Pat. No. 4,972,942.

[51] Int. Cl.6 .............................................. B65G 15/42
[52] U.S. Cl. .................................. 198/690.2; 198/853
[58] Field of Search ...................... 198/690.2, 852, 853

[56] References Cited

U.S. PATENT DOCUMENTS

| | | |
|---|---|---|
| D. 291,777 | 9/1987 | Lapeyre et al. . |
| 912,600 | 2/1909 | McPherson . |
| 1,027,352 | 5/1912 | Morse . |
| 1,558,719 | 10/1925 | Sturtevant . |
| 1,561,676 | 11/1925 | Wertman . |
| 1,562,843 | 11/1925 | Belcher . |
| 1,564,798 | 12/1925 | Sturtevant . |
| 1,565,760 | 12/1925 | Sutherland . |
| 1,569,234 | 1/1926 | Moller . |
| 1,638,388 | 8/1927 | Belcher . |
| 1,649,845 | 11/1927 | Moller . |
| 1,678,450 | 7/1928 | Sturtevant . |
| 2,045,646 | 6/1936 | Harris . |
| 2,413,843 | 1/1947 | Perry . |
| 2,602,344 | 7/1952 | Bremer . |
| 2,653,485 | 9/1953 | MacArthur . |
| 2,667,791 | 2/1954 | Bremer . |
| 3,159,267 | 12/1964 | Jeffrey . |
| 3,261,451 | 7/1966 | Roinestad . |
| 3,269,526 | 8/1966 | Imse et al. . |
| 3,348,680 | 10/1967 | Mathews et al. . |
| 3,724,285 | 4/1973 | Lapeyre . |
| 3,939,964 | 2/1976 | Poerink . |
| 4,222,483 | 9/1980 | Wootton et al. . |
| 4,449,960 | 5/1984 | van der Lely . |
| 4,507,106 | 3/1985 | Cole, Jr. . |
| 4,581,001 | 4/1986 | Rattunde et al. . |
| 4,729,469 | 3/1988 | Lapeyre et al. . |
| 4,741,431 | 5/1988 | Whitehead . |
| 4,832,183 | 5/1989 | Lapeyre . |
| 4,832,187 | 5/1989 | Lapeyre . |
| 4,858,753 | 8/1989 | Hodlewsky . |
| 4,865,183 | 9/1989 | Hodlewsky et al. . |
| 4,925,013 | 5/1990 | Lapeyre . |
| 5,165,514 | 11/1992 | Faulkner ................... 198/690.2 |

FOREIGN PATENT DOCUMENTS

| | | |
|---|---|---|
| 0032797 | 7/1981 | European Pat. Off. . |
| 0288409 | 10/1988 | European Pat. Off. . |
| 0380201 | 1/1990 | European Pat. Off. . |
| 1066905 | 4/1967 | United Kingdom . |
| 1475693 | 6/1977 | United Kingdom . |
| 9008080 | 7/1909 | WIPO . |

Primary Examiner—Joseph E. Valenza
Attorney, Agent, or Firm—Dunlap & Codding

[57] ABSTRACT

The present invention relates generally to conveyor belts and, more particularly, but not by way of limitation, to a conveyor belt having ribs formed on a lower surface thereof for moving particles generally outwardly toward the first and the second sides of link assemblies which form the conveyor belt, and to a conveyor belt constructed of modules shaped so that the interconnections between modules are offset between each link assembly and adjacent link assemblies, and a flight link having curved portions formed the faces thereof so product slides on the surfaces rather than being toppled and a conveyor belt with a tracking product groove to substantially limit lateral movement of the conveyor belt.

3 Claims, 8 Drawing Sheets

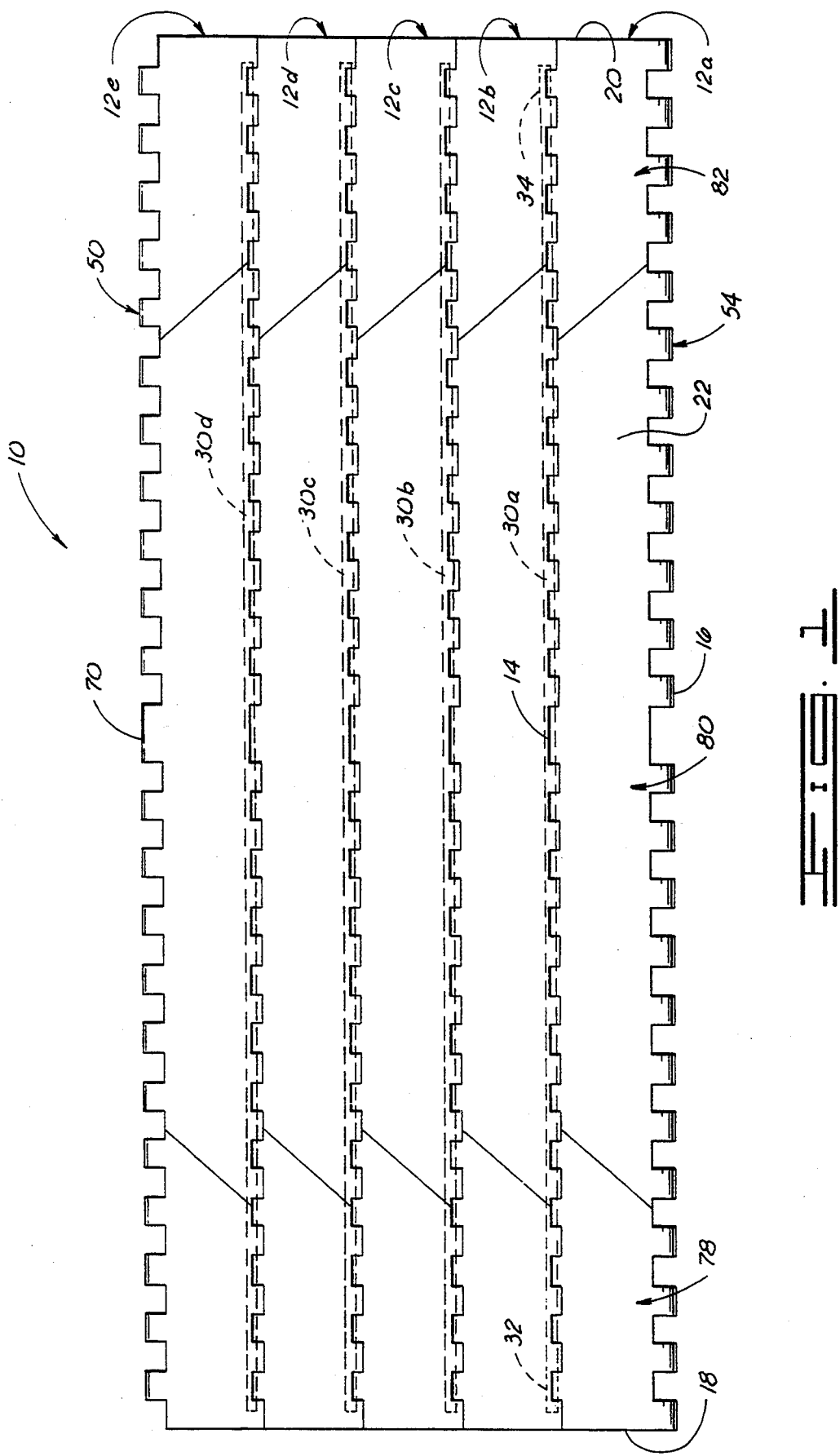

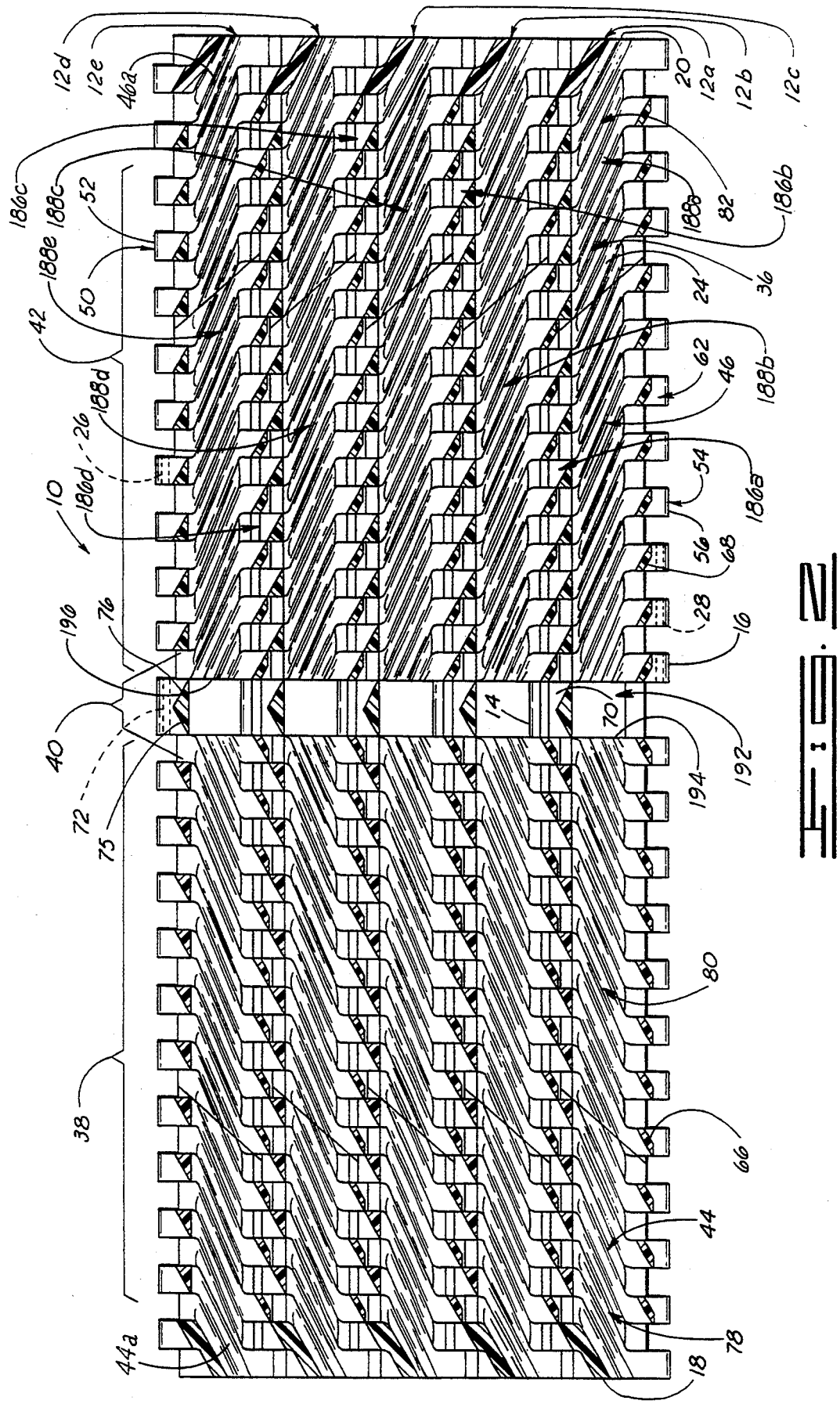

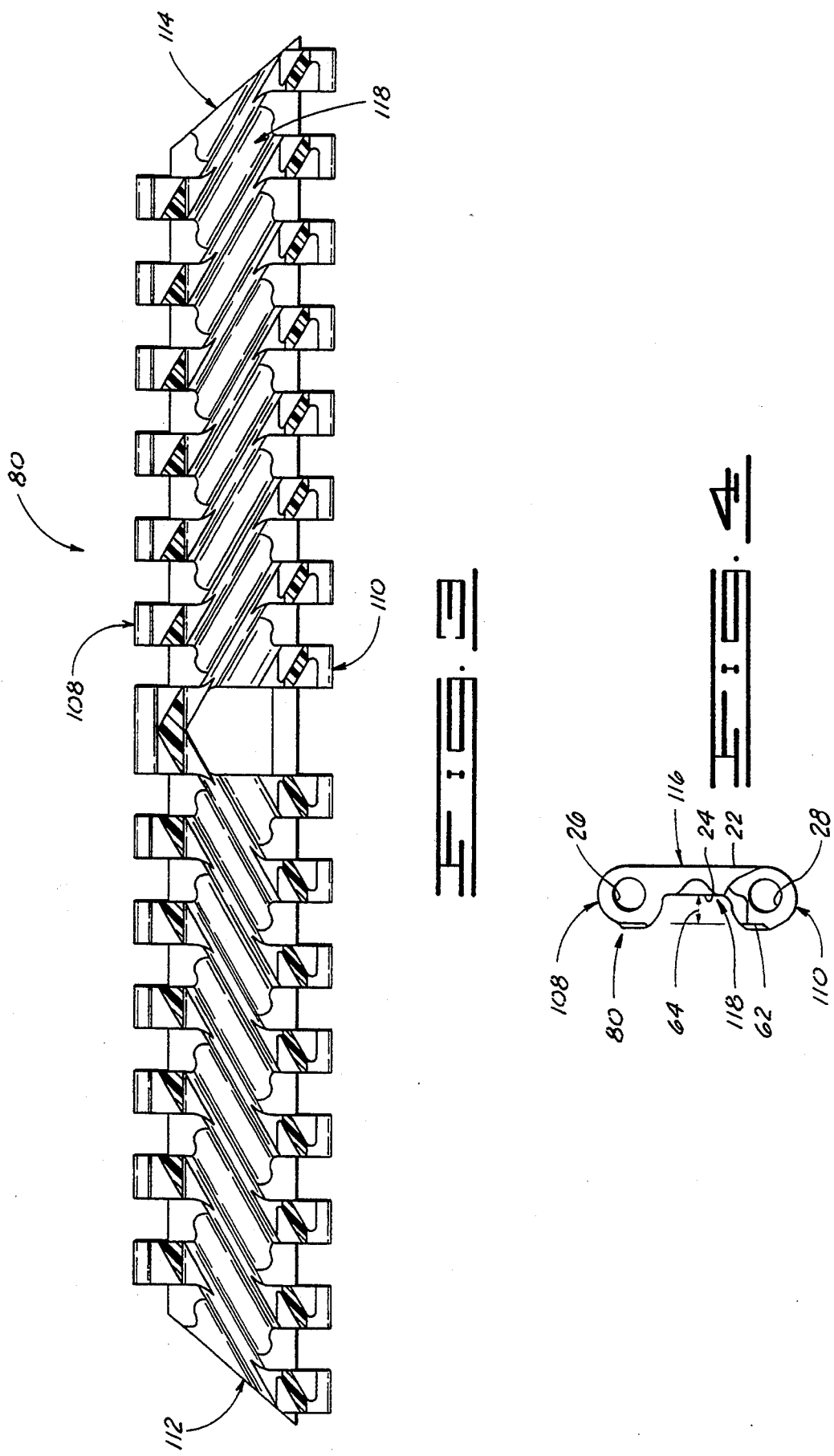

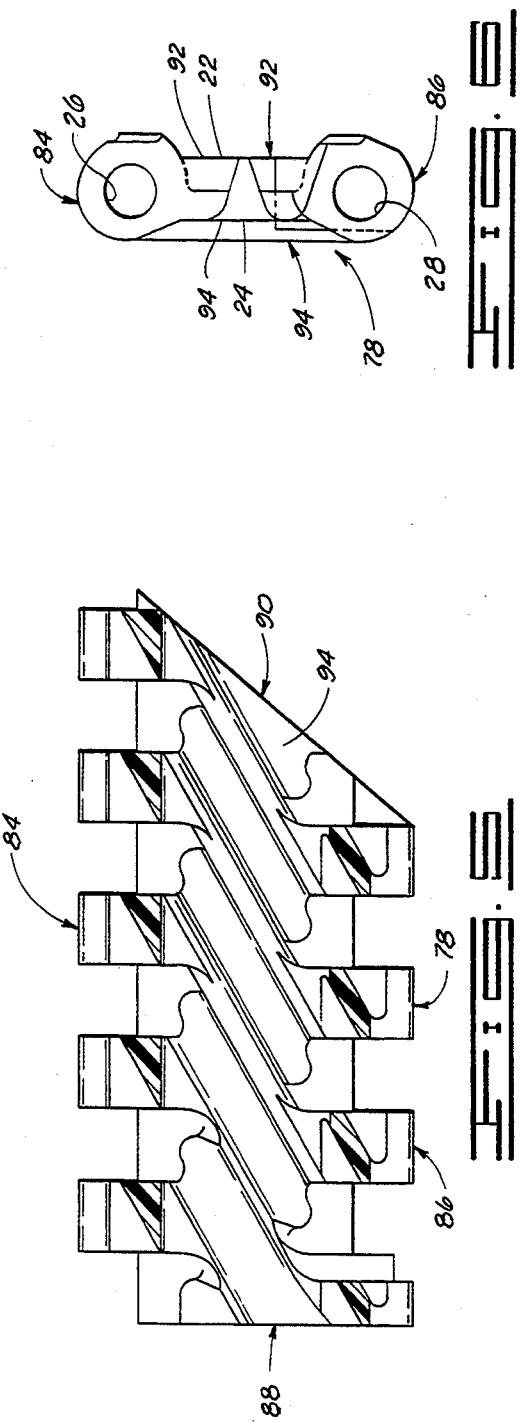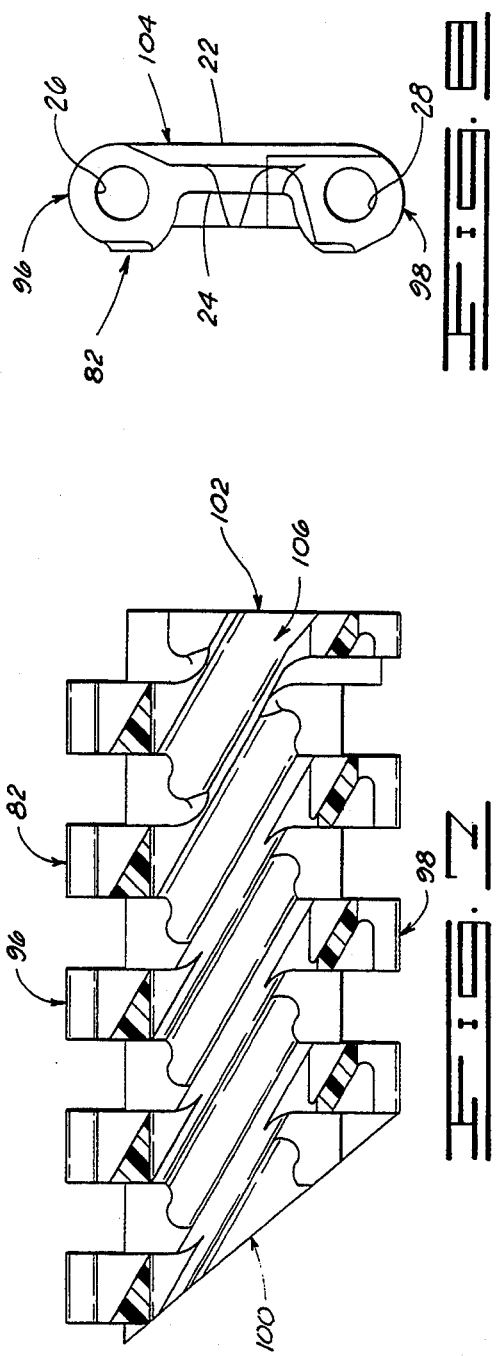

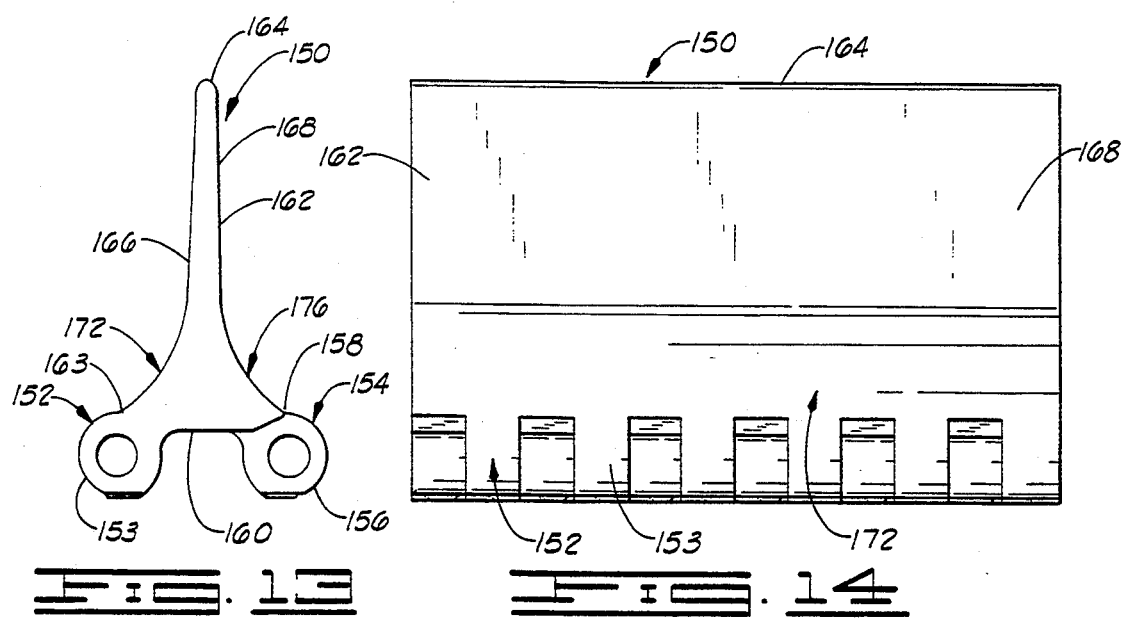
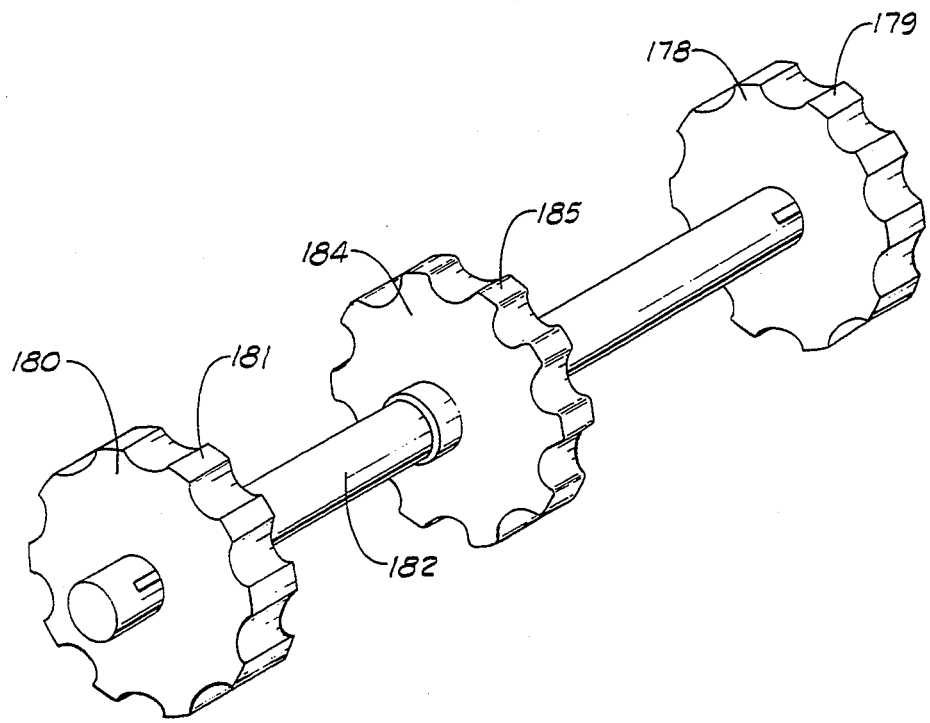

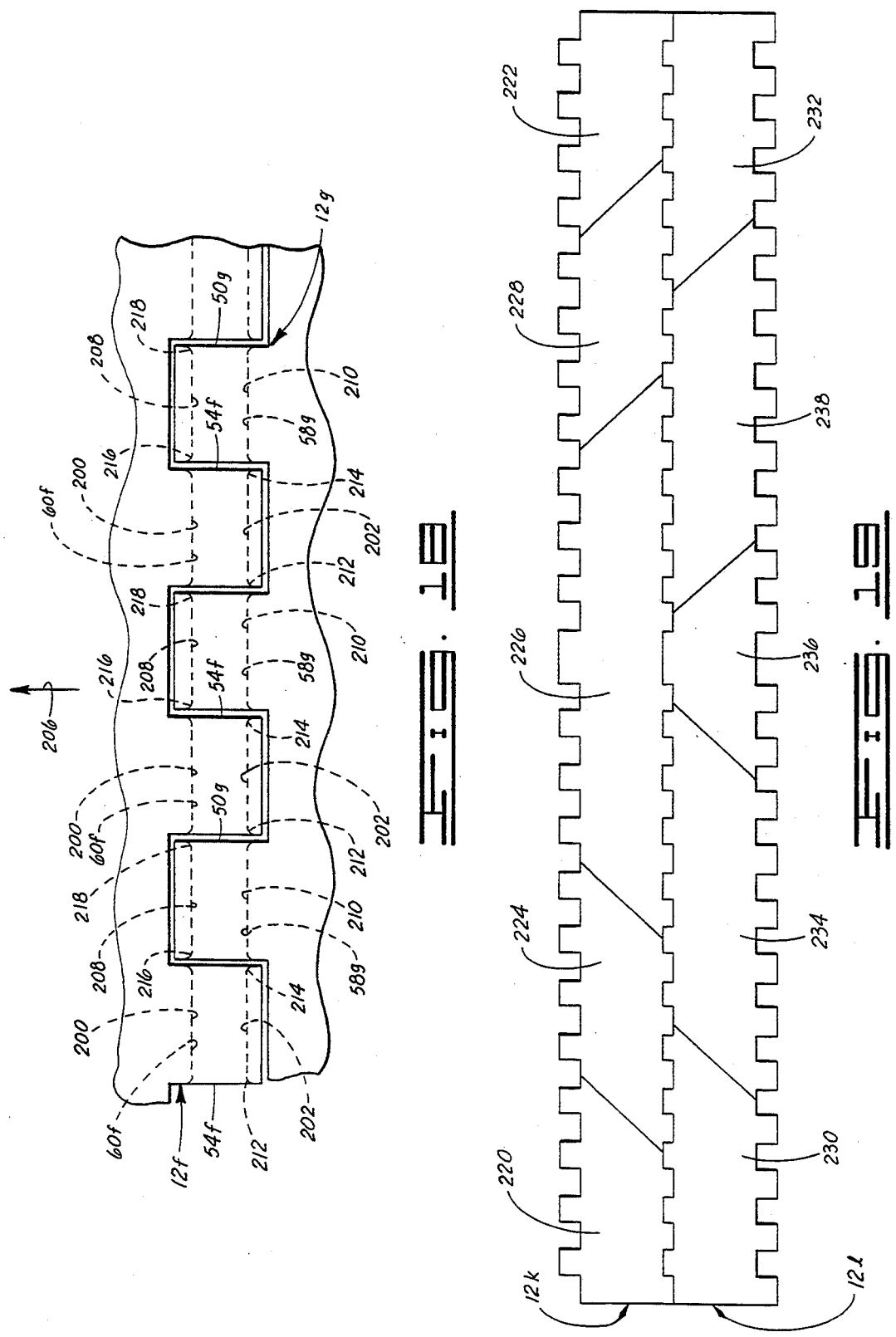

CONVEYOR INCOPORATING CURVED SURFACE FLIGHT LINKS

CROSS REFERENCE TO RELATED APPLICATIONS

This application is a continuation of application U.S. Ser. No. 08/117,566, filed Sep. 3, 1993 entitled "CONVEYOR INCORPORATING CURVED SURFACE FLIGHT LINKS (Amended)", now abandoned which is a continuation of U.S. Ser. No. 07/982,816, filed Nov. 30, 1992 entitled "FLAT TOP CONVEYOR", now abandoned, which is a continuation of U.S. Ser. No. 07/660,977, filed Feb. 26, 1991, entitled "FLAT TOP CONVEYOR", now abandoned, which is a divisional of U.S. Ser. No. 07/366,773, filed Jun. 14, 1989, entitled "FLAT TOP CONVEYOR BELT", now issued U.S. Pat. No. 5,020,656, issued Jun. 4, 1991, which is continuation-in-part of U.S. Ser. No. 07/220,601, filed Jul. 18, 1988, entitled "CONVEYOR BELT", now issued U.S. Pat. No. 4,972,942, issued Nov. 11, 1990.

FIELD OF THE INVENTION

The present invention relates generally to conveyor belts and, more particularly, but not by way of limitation, to a conveyor belt having ribs formed on a lower surface thereof for moving particles generally outwardly toward the first and the second sides of link assemblies which form the conveyor belt, and to a conveyor belt constructed of modules shaped so that the interconnections between modules are offset between each link assembly and adjacent link assemblies, and a flight 1 ink having curved portions formed the faces thereof so product slides on the surfaces rather than being toppled and a conveyor belt with a tracking product groove to substantially limit lateral movement of the conveyor belt, and a conveyor belt supported on sprockets where the sprockets are movable to the belt laterally fixed to the shaft to allow for belt growth in width due to thermal and moisture variations.

BRIEF DESCRIPTION OF THE DRAWINGS

FIG. 1 is a top plan view of a portion of a conveyor belt constructed in accordance with the present invention, the portion of conveyor belt shown in FIG. 1 comprises only five link assemblies.

FIG. 2 is a bottom plan view of the conveyor belt shown in FIG. 1.

FIG. 3 is a bottom plan view of a central link module which is a portion of each of the link assemblies forming the conveyor belt.

FIG. 4 is an end view of the central link module shown in FIG. 3.

FIG. 5 is a bottom plan view of a first end link module forming a portion of each of the link assemblies.

FIG. 6 is an end view of the first end link module shown in FIG. 5.

FIG. 7 is a bottom plan view of a second end link module forming a portion of each of the link assemblies.

FIG. 8 is a end view of the second end link module shown in FIG. 7.

FIG. 13 is an end elevational view of a flight link constructed in accordance with the present invention.

FIG. 14 is a front elevational view of the flight link of FIG. 13.

FIG. 15 is a diagrammatic view showing a typical sprocket arrangement for driving and tracking a conveyor belt constructed in accordance with the present invention.

FIG. 18 is a partial view schematically illustrating two link assemblies positioned to be interconnected by a link shaft showing modified projection link openings.

FIG. 19 is a top plan view of a portion of a conveyor belt having modified link assemblies.

DESCRIPTION OF THE PREFERRED EMBODIMENTS

Figure 9:
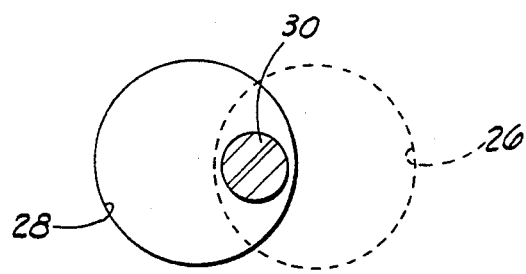
FIG. 9 is a diagrammatic view of a link shaft disposed through two projection link openings illustrating in exaggerated form the positions during the operation of the conveyor.

The description in the co-pending application entitled "Conveyor Belt"; Ser. No. 220,601; filed Jul. 18, 1988, hereby specifically is incorporated herein by reference.

Shown in FIGS. 1 and 2 and designated therein by the general reference numeral 10 is a conveyor belt which is constructed in accordance with the present invention. The conveyor belt 10 comprises a plurality of link assemblies 12. Only a portion of the conveyor belt 10 is shown in FIGS. 1 and 2 and, more particularly, only five link assemblies 12 of the conveyor belt 10 are shown in FIGS. 1 and 2 wherein the five link assemblies are designated by the individual reference numerals 12a, 12b, 12c, 12d and 12e, respectfully. It is to be understood that a conveyor belt constructed in accordance with the present invention in practice will comprise a large number of link assemblies 12 interconnected to form an endless conveyor belt 10 which generally is extended about sprockets and used for conveying objects in a manner well known in the art.

As shown in FIGS. 1 and 2, each link assembly 12 has a forward end 14, a rearward end 16, a first side 18, a second side 20, an upper surface 22 (shown in FIG. 1) and a lower surface 24 (shown in FIG. 2). The forward and rearward ends 14 and 16, the first and the second sides 18 and 20 and the upper and the lower surfaces 22 and 24 are shown in FIGS. 1 and 2 and designated with specific reference numerals therein only with respect to the link assembly 12a.

Each link assembly 12 also includes a first shaft opening 26 (shown in FIG. 2) which extends generally between the first and the second sides 18 and 20 and which extends through the forward end 14 of each 1 ink assembly 12. Each 1 ink assembly 12 also includes a second shaft opening 28 (shown in FIG. 2) which extends through the rearward end 16 of each link assembly 12 and which extends generally between the first and the second sides 18 and 20 of each link assembly 12. The dotted lines showing the shaft openings 26 and 28 are only partially shown in FIG. 2 and the dotted lines are not shown extending through each of the shaft projections 50 and 54.

The conveyor belt 10 also includes a plurality of link shafts 30 (FIGS. 1 and 2). Four link shafts 30 are shown in FIG. 1 in dashed lines and designated therein by the general reference numerals 30a, 30b, 30c and 30d. Each link shaft 30 extends through the first shaft opening 26 in one of the link assemblies 12 and through the second shaft opening 28 in another link assembly 12 for connecting the two link assemblies 12.

Each link shaft 30 includes a first end 32 and a second end 34, as shown in FIG. 1 with respect to the link shaft 30a. The first end 32 of each link shaft 30 is disposed generally near and spaced a distance from the first side 18 of one of the link assemblies 12 and the second end 34 of each link shaft 30 is disposed generally near and spaced a distance from the second side 20 of one of the link assemblies 12.

As shown in FIG. 2, a plurality of belt ribs 36 are formed on the lower surface 24 of each of the link assemblies 12. Each belt rib 36 is spaced a distance from the adjacent belt ribs 36. Each belt rib 36 extends at an angle generally between the forward end 14 and the rearward end 16 of each of the link assemblies 12. Each link assembly 12 comprises a first half 38 extending generally between the first side 18 and a central portion 40 of the link assembly 12 and a second half 42 extending generally between the second side 20 and the central portion 40 of each link assembly 12.

A plurality of spaced apart first belt ribs 44 (FIG. 2) are formed on the lower surface 24 of each link assembly 12. The first belt ribs 44 are disposed generally within the first half 38 of each link assembly 12. Each of the first belt ribs 44 extends generally between the forward end 14 and the rearward end 16 of one of the link assemblies 12. The first belt ribs 44 are angled generally from the forward end 14 toward the first side 18 of each link assembly 12. Each of the first belt ribs 44 extends a distance outwardly from the lower surface 24 of the link assembly 12.

Each link assembly 12 also includes a plurality of second belt ribs 46 (FIG. 2) formed on the lower surface 22 of each link assembly 12. The second belt ribs 46 are disposed generally within the second half 42 of each of the link assemblies 42. Each second belt rib 46 extends generally between the forward end 14 and the rearward end 16 of the link assemblies 12. Each of the second belt ribs 46 extends a distance at an angle generally from the forward end 14 of each of the link assemblies 12 generally toward the second side 20 of each of the link assemblies 12. Each of the second belt ribs 46 extends a distance generally outwardly from the lower surface 24 of each of the link assemblies 12.

A plurality of spaced apart forward shaft projections 50 (FIGS. 1 and 2) are formed on the forward end 16 of each of the link assemblies 12 (only one forward shaft projection 50 is designated with a reference numeral in FIGS. 1 and 2). Each of the forward shaft projections 50 extends a distance outwardly from the lower surface 24 of each of the link assemblies 12. Each of the forward shaft projections 50 extends a distance beyond the first and the second belt ribs 44 and 46 terminating with an outward end 52 (shown in FIG. 2 with respect to one of the forward shaft projections 50). The outward ends 52 of each of the forward shaft projections 50 are disposed in a common plane.

Each of the link assemblies 12 also includes a plurality of spaced apart rearward shaft projections 54 formed on the rearward end 16 of each of the link assemblies 12 (only one of the rearward shaft projections 54 designated with a reference numeral in FIGS. 1 and 2). Each of the rearward shaft projections 54 extends a distance outwardly from the lower surface 24 of each of the link assemblies 12 terminating with an outward end 56 (shown in FIG. 2 with respect to one of the rearward shaft projections 54). The outward ends 56 of the rearward shaft projections 54 are disposed in a common plane.

A projection link opening 58 is formed through each of the forward shaft projections 50 (shown in FIGS. 4, 6 and 8). A projection link opening 60 is formed through each of the rearward shaft projections 54. The projection link openings 58 are aligned and the projection link openings 60 are aligned.

The forward shaft projections 50 are spaced apart. The space between each of the forward shaft projections 50 is sized so that a rearward shaft projections 54 may be slidingly disposed in the space generally between two forward shaft projections 50.

The rearward shaft projections 54 are spaced apart. The space between two adjacent rearward shaft projections 54 is sized so that a forward shaft projection 50 may be slidingly disposed generally within the space formed between two adjacent rearward shaft projections 54. It should be noted that the shaft projections 50 and 54 may have uniform widths and the spaces between pairs of shaft projections 50 and 54 respectively also may be uniform for an overall uniform appearance, or these widths and spaces may vary in size to ensure proper orientation of the link assemblies 12 or for increasing shear or tensile strength in different regions of the belt width.

In the assembled position of the link assemblies 12, the outward ends 52 and 56 of the respective forward and rearward shaft projections 50 and 54 are disposed about in a co-planar disposition and cooperate to form a support surface 62 (FIG. 2) which is spaced a distance 64 (FIG. 4) from the lower surface 24 of the link assemblies 12.

A plurality of first support surface ribs 66 (one first support surface rib 66 being designated by reference numeral in FIG. 2) are formed on the support surface 62 formed by the forward and rearward shaft projections 50 and 54 disposed generally within the first halves 38 of the link assemblies 12. Each of the first support surface ribs 66 extends a distance outward from the outer ends 52 and 56, respectively. Each of the first support surface ribs 66 extends at an angle generally from the forward end 14 generally toward the first side 18 of each of the link assemblies 12.

A plurality of second support surface ribs 68 (one first support surface rib 68 being designated by reference numeral in FIG. 2) are formed on the portion of the support surface 62 formed by the forward and rearward shaft projections 50 and 54 disposed generally within the second halves 42 of the link assemblies 12. Each of the second support surface ribs 68 extends a distance outwardly from one of the outward ends 52 or 56 of the forward and rearward shaft projections 50 and 54, respectively. Each of the second support surface ribs 68 extends at an angle generally from the forward end 14 of one of the link assemblies 12 generally toward the second side 20 of one of the link assemblies 12.

A central shaft projection 70 (only one central shaft projection 70 is designated with a reference numeral in FIGS. 1 and 2) is formed on the lower surface 24 of each of the link assemblies 12. Each central shaft projection 70 extends a distance outwardly from the lower surface 24 of one of the link assemblies 12. Each central shaft projection 70 is disposed generally within the central portion 40 of one of the link assemblies 12. A projection link opening 72 (only one of the projection link openings 72 being shown in dashed lines and designated with a reference numeral in FIG. 2) is formed through a central portion of each of the central shaft projection 70.

Each of the central shaft projections 70 extends a distance outwardly from the lower surface 24 terminating with an outward end 74. A first central rib 75 (shown in FIG. 2 with respect to one of the first central ribs 75) is formed on each outward end 74 and each first central rib 75 extends at an angle generally from the forward end 14 toward the first side 18. A second central rib 76 is formed on each outward end 74 and each second central rib 76 (shown in FIG. 2 with respect to one of the second central ribs 76) extends at an angle generally from the forward end 14 toward the second side 20.

In an assembled position of the link assemblies 12, the forward end 14 of each of the link assemblies 12 is disposed generally near or adjacent the rearward end 16 of one of the other link assemblies 12. In this position, the forward shaft projections 50 are each disposed generally within the space between two adjacent rearward shaft projections 54 and each of the rearward shaft projections 54 is disposed generally within the space formed between two of the forward shaft projections 50. The central shaft projection 70 formed on each of the link assemblies 12 is disposed generally within the space formed between two rearward shaft projections 54. The projection link openings 58, 60 and 72 are aligned. The aligned projection link openings 58 and 72 cooperate to form the first shaft opening 26 and the aligned projection link openings 60 and 72 cooperate to form the second shaft opening 28. In this connected position of two link assemblies 12, a link shaft 30 is disposed generally through the aligned projection link openings 58, 60 and 72 to a position to wherein the first end 32 of each link shaft 30 is disposed generally near and spaced a distance from first side 18 of one of the link assemblies 12 and the second end 34 of each of the link shaft 30 is disposed generally near and spaced a distance from the second side 20 of each of the link assemblies 12.

In the interconnected position of the link assemblies 12 to form the conveyor belt 10, the first belt ribs 44 are disposed generally within the first halves 38 of each of the link assemblies 12 and each is angled outwardly from the central portions 40 toward the first side 18. The second belt ribs 46 are disposed generally within the second halves 42 of each of the link assemblies 12 and each is angled outwardly from the central portions 40 generally toward the second side 20. Further, the first support surface ribs 66 each are angled outwardly from the central portions 40 generally toward the first sides 18 and the second support surface ribs 68 each are angled outwardly from the central portions 40 toward the second sides 20. The first central ribs 74 also are angled outwardly generally from the central portions 40 toward the first side 18 and the second central ribs 76 are angled outwardly generally from the central portions 40 generally toward the second sides 20.

Each link assembly 12 comprises a first end link module 78, (shown in FIGS. 1, 2, 5 and 6), a central link module 80 (shown in FIGS. 1, 2, 3 and 4) and a second end link module 82 (shown in FIGS. 1, 2, 7 and 8). Only the modules 78, 80 and 82 for the link assembly 12a are designated with reference numerals in FIGS. 1 and 2.

As shown more clearly in FIGS. 5 and 6, the first end link module 78 has a forward end 84, a rearward end 86, a first side 88, a second side 90, an upper surface 92 and a lower surface 94. In an interconnected position of the modules to form the link assemblies 12, the first sides 88 of the first end link modules 78 cooperates to form the first sides 18 of the link assembly 12. The second side 90 of the first end link module 78 is formed at an angle.

As shown in FIGS. 7 and 8, the second end link module 82 has a forward end 96, a rearward end 98, a first side 100, a second side 102, an upper surface 104 and a lower surface 106. The second side 102 of the second end link module 82 cooperates to form the second sides 20 of the link assembly 12 in an interconnected position of the modules 78, 80 and 82. The first side 100 of the second end link module 82 is formed at an angle.

As shown more clearly in FIGS. 3 and 4, each central link module 80 has a forward end 108, a rearward end 110, a first side 112, a second side 114, an upper surface 116 and a lower surface 118. The first side 112 is formed at an angle so that the first side 112 of the central link module 80 mates with the second side 90 of the first end link module 78. The second side 114 of the central link module 80 is formed at an angle so that the second side 114 of the central link module 80 mates with the first side 100 of the second end link module 82.

It should be noted that the central link module 80 has an overall generally trapezoidal shape.

In an assembled form in a link assembly 12, the second side 90 of the first end link module 78 is disposed generally adjacent the first side 112 of the central link module 80. The second side 114 of the central link module 80 is disposed generally adjacent the first side 112 of the second end link module 82.

Because of the angled sides 90, 100, 112 and 114, the connections between first end link end modules 78 of adjacent link assemblies 12 are offset and the connections between the second end link modules 82 of adjacent link assemblies 12 also are offset. This offsetting interconnection between first and second end link modules 78 and 80 in adjacent link assemblies 12 results in a stronger overall conveyor belt 10 construction, while allowing each link assembly 12 to be uniform.

The link assemblies 12 preferably are constructed of a molded plastic or ceramic materials and the link shafts 30 also are constructed of a plastic or ceramic material.

In one preferred form, as shown in FIG. 9, the projection link openings 58 in the forward shaft projections 50 generally are each circularly shaped and each has a diameter about equal to the diameter of the circularly shaped projection link openings 60 in the rearward shaft projects 54. The projection link opening 58 and 60 each have a diameter larger than the diameter of the link shafts 30.

In the operating position when the conveyor belt 10 is under tension, the forward shaft projections 50 tend to be pulled away from the rearward shaft projections 54 so that the projection link openings 58 and 60 are offset, as shown in an exaggerated form in FIG. 9. The link shaft 30 is disposed generally within the area or clearance between the two offset projection link openings 58 and 60. The diameters of the link shaft openings 58 and 60 are sized to be large enough so that, in the assembled and operating position when the conveyor belt 10 is under tension, there is sufficient space within the projection link openings 58 and 60 occupied by the link shaft 30 so the link shaft 30 can rotate or roll on the surface formed by the projection link openings 58 and 60 in the respective forward and rearward projections 50 and 54 throughout the entire movement of the link shaft 30 as the conveyor belt 10 is moved about one of the sprockets. Preferably, the diameters of the projection link openings 58 and 60 are sized so that the link shaft 30 rolls over the surfaces formed by the projection link openings 58 and 60 at least a period of time in excess of fifty percent of the time that the belt is being moved about a sprocket or over some curved path. The rolling action of the link shafts 30 on the surfaces formed by the projection link openings 58 and 60 reduces the wear on the surfaces. It should be noted that the rolling action described before also can be expressed in terms of the surfaces formed by the projection link openings 58 and 60 rolling on the link shaft 30.

The diameters of the projection link openings 58 and 60 are sized so that the link shafts 30 roll on the surfaces formed in the forward shaft projections 50 by the projection link openings 58 when the conveyor belt 10 is moved over a curved path such as over a sprocket. Initially, the diameter of the link shafts 30 must be selected so the link shafts 30 will have sufficient shear strength for the particular application. For example, assume a link shaft diameter of 0.150 inches. The number of teeth in the sprockets then is determined. Assume a sprocket with 12 teeth for example. In this example, the link shaft 30 will rotate 30 degrees (360÷12). The length of rolling contact from a horizontal centerline will be [(1/12) (p)(0.150)=0,039 inches]. The rolling contact angle from incline of enlarged hole for a ¼ inch radius is (0.039)(360)+(R)(2)(p)] or the size of a straight line is [(0.039)(2)(0.150)=0.228].

When the conveyor belt 10 is moved over a radius such as about a sprocket, the link shaft 30 attempts to rotate in the clearance between the projection link openings 58 and 60 (see FIG. 9). As the link shaft 30 attempts to rotate further it sees friction. Since the opposing force is a rolling action with no friction, the link shaft 30 becomes stationary with respect to surface formed by the projection link opening 60 (FIG. 9). The surface formed by the projection link opening 58 rolls on the link shaft 30 until the link shaft 30 reaches the bottom of the clearance between the projection link openings 58 and 60 (the middle of this clearance).

The foregoing example assumes a 12 tooth sprocket. A 24 tooth sprocket would cause the surfaces to roll on the link shaft 30 only half way to the top of the clearance. A 6 tooth sprocket would cause the surfaces to roll on the link shaft 30 to the top of the clearance and then rotation would occur between the link shaft 30 and either or both surfaces formed by the projection link openings 58 and 60.

Since wear is a function of friction between the surfaces sliding against each other and pressure, zero friction occurs during rotation. Utilizing the present design, the duration of friction is shortened by designing the radius of the surfaces formed by the projection link openings 58 and 60 so that the surfaces rollingly contact the link shaft 30 over a substantial period of the time the conveyor belt is moved about the sprocket, thereby substantially reducing wear on the link shaft 30.

By way of a second example, assume a diameter of 0.250 inches for the link shaft 30. The number of teeth in the sprockets is determined that the conveyor belt 10 is to roll over during sprocket to belt engagement. For this example, assume a 10 tooth sprocket. The link shaft 30 will rotate 36 degrees [360÷10]. The length of rolling contact from horizontal centerline is 0.0236 [1/10×p×0,150/2]. The minimum size of the projection link openings 58 and 60 is 0.2972 inches [0.0236×2+−0.250]/ The rolling contact angle of either projection link opening 58 or 60 is 7.2 degrees assuming 0.375 inch diameter projection link openings 58 or 60 [(0.236)(360)+(0.1875)(2)(p)] or a size of a square line hole of 0.2972 inches [(0.0236)(2)+(2.5)].

In this last example, the surfaces will roll on link shaft 30 until the link shaft 30 has reached the bottom of the clearance, assuming the 10 tooth sprocket. A 20 tooth sprocket would cause the surfaces to roll on the link shaft 30 only half way to the 18 degrees. A 5 tooth sprocket would cause the surface to roll on the link shaft 30 until the surface becomes too steep and, at that point, rotation would occur between the link shaft 30 and either of the surfaces formed by the projection link openings 58 and 60.

Figure 10:
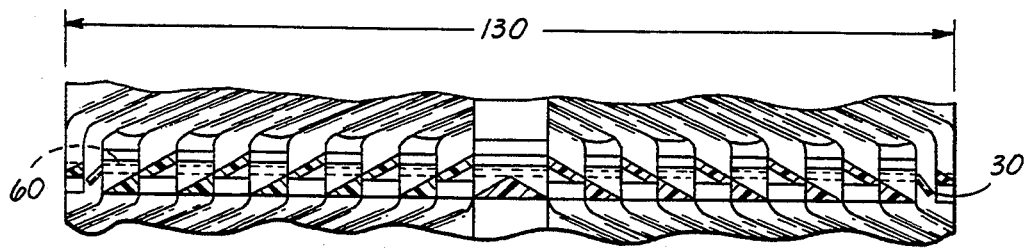
FIG. 10 is a diagrammatic view of a link assembly with a shaft disposed generally through the projection link openings.

The plastic rod shaped link shafts 30, normally are stored rolled about a reel so that a permanent bow is set in the length of material stored on the reel. The link shafts 30 are made from the reel of material by cutting the desired length of material from the length of material stored on the reel. The link shafts 30 constructed in this matter tend to bow or curl as indicated in FIG. 10. The length of the link shaft 30 is less than the width 130 of the conveyor belt 10 and with the link shaft 30 bowed, the ends 32 and 34 of the link shaft 30 tend to abut the last rearward shaft projections 54 and are not aligned with the projection link opening 60 formed therethrough. This abutment between the last rearward shaft projection 54, that is, the rearward shaft projection 54 generally adjacent the respective first and second sides 18 and 20 of the link assemblies 12, keeps the link shafts 30 in position interconnecting adjacent link assemblies 12 and prevents the link shafts 30 from being removed through the last rearward shaft projection 54. When it is desired to remove the link shaft 30 for disassembling a adjacent link assemblies 12, the end 32 or 34 can be bent slightly into alignment with the projection link opening 60 in the rearward shaft projection 54 generally adjacent the first or the second side 18 or 20 of the link assembly 12 and the link shaft 30 then can be removed through all of the projection link openings 58 and 60. It should be noted that this design feature may not be desirable in all applications.

Figure 11:
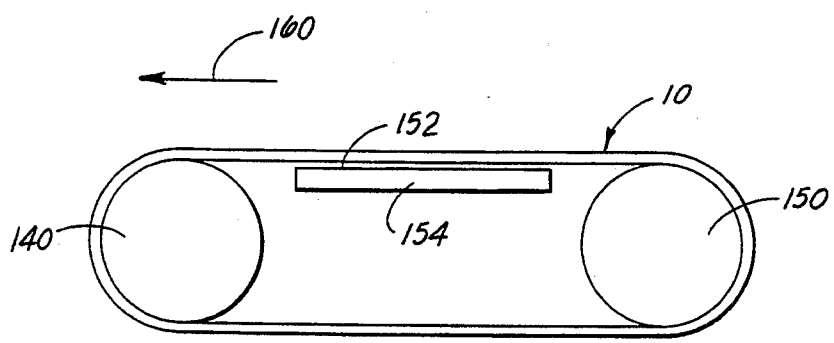
FIG. 11 is a diagrammatic view showing a conveyor belt constructed in accordance with the present invention operatively disposed about two sprockets.

Shown in FIG. 11 is a conveyor belt 10 (diagrammatically shown) operatively connected to two sprockets 140 and 150. A portion of the conveyor belt 10 rides on a support surface 152 of a support 154. In typical operating environments for the conveyor belt 10, it is common for the conveyor belt 10 to ride on a support surface such as the support surface 152.

When the conveyor belt 10 or the upper portion thereof is being moved in the direction 160 over the support surface 152, the support surface ribs 68 and 70 form on the forward and rearward shaft projections 50 and 54, respectively, tend to engage the support surface 152 and move any material which may be disposed on the support surface 152 generally toward the first or the second sides 18 or 20 of the link assemblies 12 thereby tending to remove material from the support surface 152. Further, the belt ribs 44 and 46 and the support surfaces ribs 66 and 68 when moving over the surface 150 cooperate to move any material which may be deposited on the lower surface 24 of the conveyor 10 outwardly toward the first and second sides 18 and 20 thereby tending to auger clean such materials from the conveyor belt 10.

Figure 12:
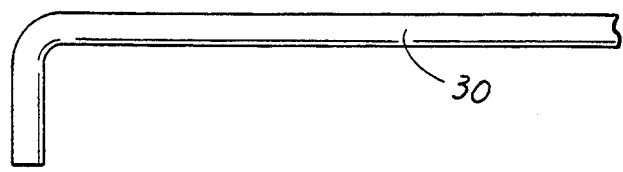
FIG. 12 is a view of one end of a link shaft illustrating one technique for retaining the link shafts in position connecting two link assemblies.

As shown in FIG. 12 and in one preferred form, the end 32 of each of the link shafts 30 is bent at an angle to prevent the link shafts 30 from exiting through the two rearward shaft projections 54 disposed generally at the first side 18 of each of the link assemblies 12 thereby preventing the link shafts 30 from moving through the projection link openings 60 in these two rearward shaft projections 54 to secure the link shafts 30 in an assembled position. This construction is in lieu of the construction shown in FIG. 10 and described in detail before.

Shown in FIGS. 13 and 14 is a typical flight link 150 constructed in accordance with the present invention. The flight link 150 has a plurality of spaced apart forward shaft projections 152 formed on a forward end 153 thereof and a plurality of spaced apart rearward shaft projections 154 formed on a rearward end 156 thereof.

The flight links 150 are adapted to be interposed between two adjacent link assemblies 12 and the flight links 150 cooperate to connect two adjacent link assemblies 12. The flight links 150 are spaced a distance apart over the length of a conveyor belt 10 and interposed between adjacent link assemblies 12 in some applications.

Each flight link 150 has an upper surface 158 and a lower surface 160. Each flight link 150 includes a flight 162 which extends a distance generally upwardly from the upper surface 158 of the flight link 150 terminating with an upper end 164. Each flight 162 has a forward face 166 and a rearward face 168.

A portion of the forward face 166 of each flight 162 generally starting at the lower end 163 thereof and extending a distance generally upwardly toward the upper end 164 thereof is formed on a radius 170 thereby forming a curved portion 172 on each forward face 166. The radius 170 and the curved portion 172 each are sized, so that during the operation of the conveyor, material, such as a potato chip, tends to move or slide over the curved portion 172 without being flipped or overturned. In essence, the material tends to wipe the curve portion 172 as the belt is moved from a horizontal toward an inclined position during the operation of the conveyor belt 10 with the flight link 150 operatively connected thereto.

The rearward face 168 of each flight 162 is formed on a radius 174 identical to the radius 170 thereby forming a curved portion 176 which is identical to the curved portion 172. The curved portion 176 is constructed and operates in the manner exactly like the curved portion 172 described in detailed before.

In the manufacture of food products such as potato chips, it frequently is required to elevate these products. Quite often this is done on an included conveyor. To prevent products from slipping back on these include conveyors, upright lateral fences, called cleats or flights, are periodically spaced on the conveyor belt. The prior cleats generally have been "T" shaped with only a minimum radius, generally less than ⅜ inch, at the junction between the horizontal and vertical members.

In general, the larger radius for the curved portions 172 and 176 permits small and large product to slide on the belt and flight 162. The sliding is caused by the product trying to lower its center of gravity.

The maximum symmetrical radius for the curved portions 172 and 176 is about 0.80×Pitch. The maximum one side radius for the curved portions 172 and 176 is about 1.6×Pitch. The maximum 2 Pitch, flight 162 radius for the curved portions 172 and 176 is about 3.2×Pitch. For example, a 3 inch disk will slide on a 1.5 inch radius.

The products will vary in shape and size. Most such disk shaped products will have a diameter of about ¾ inch and large product will have a diameter less than 4 inches. nI conveyors with such prior flights and without the curved portion 172, material, such as potato chips, tends to be flipped or turned over thereby causing oil and seasoning to be dislodged from the potato chip. This dislodged oil and seasoning tends to build up in the area generally adjacent the lower end 158 or 163 of the flight 162 and the flight link. This causes a loss of seasoning and, when such build up becomes dislodged, can cause an excess amount of seasoning to be deposited in a bag of potato chips. These problems are eliminated with the flight links 150. Further, the sliding action tends to wipe the curved portions 172 and 176 clean, thereby reducing sanitation requirements and reducing product contaminations from waste buildup.

Figure 16:
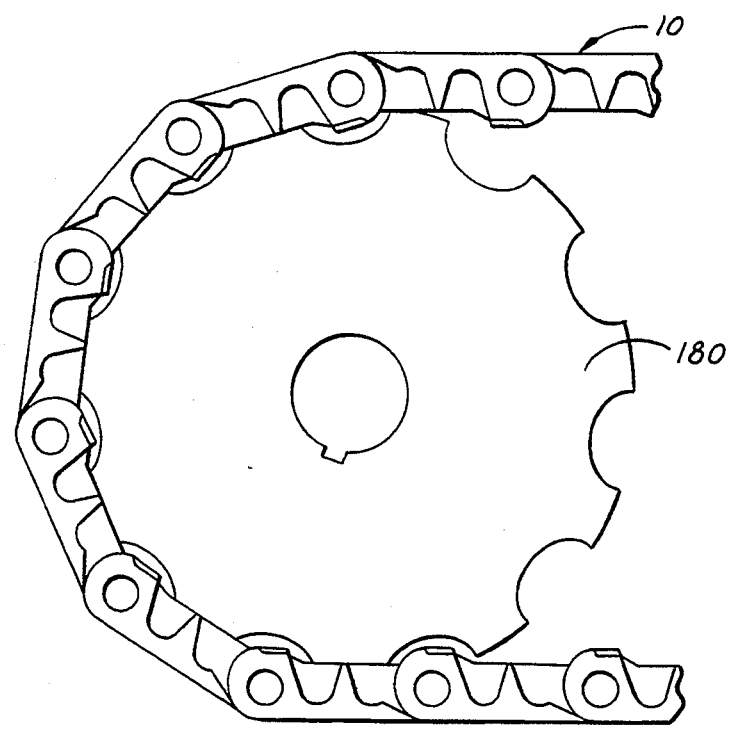
FIG. 16 is an end elevational view showing a drive sprocket operative connected to a conveyor belt constructed in accordance with the present invention.
Figure 17:
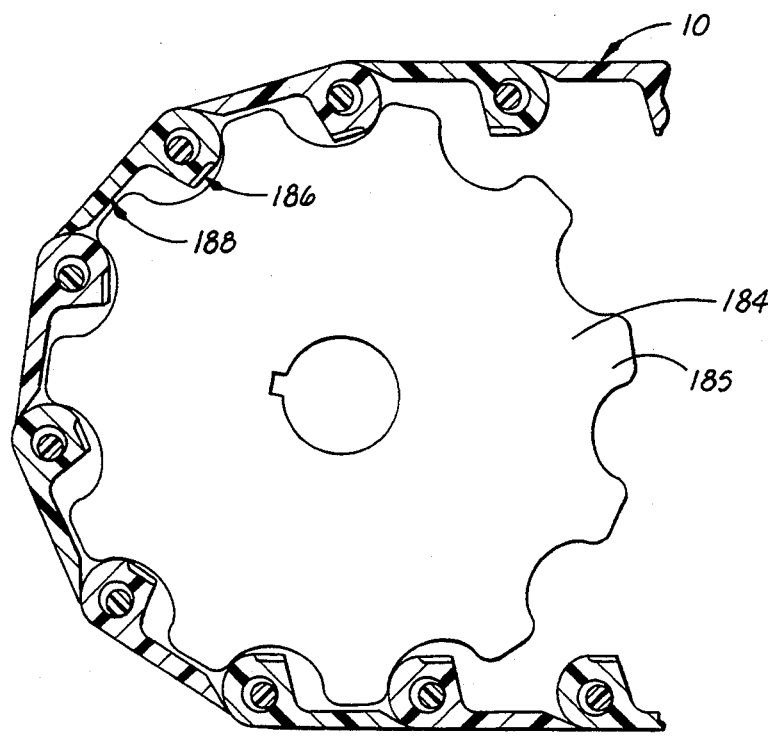
FIG. 17 is a sectional view showing a tracking sprocket operatively connected to a conveyor belt constructed in accordance with the present invention.

As mentioned before in connection with FIG. 11, the conveyor belt 10 of the present invention generally is extended about drive sprockets. Shown in FIG. 16 is a typical sprocket arrangement for driving a conveyor belt such as the conveyor belt 10. In this example, there are two drive sprockets 178 and 180, each mounted on a drive shaft 182 with one of the drive sprockets 178 being disposed generally near one end of the drive shaft 182 and the other drive sprocket 180 being disposed generally near the opposite end of the drive shaft 182. Positioned generally midway between drive sprockets 178 and 180 is a tracking sprocket 184.

The drive sprocket 179 has a plurality of teeth 179. The drive sprocket 180 has a plurality of teeth 181, the tracking sprocket 184 has a plurality of teeth 185.

The sprockets 178, 180 and 184 each are identical in construction, except the tracking sprocket 184 is slightly larger in diameter than the drive sprockets 178 and 180 for reasons which will be made more apparent below.

The tracking sprocket 184 functions to maintain the lateral position of the conveyor belt 10 during the operation of the conveyor belt 10. The drive sprockets 178 and 180 function to drivingly move the conveyor belt 10. The drive shaft 182 is connected to a driver such as an electric motor which drivingly rotates the drive shaft 182. The drive sprockets 178 and 180 each are keyed to the drive shaft 182 such that the drive rotation of the drive shaft 182 drivingly rotates the drive sprockets 178 and 180. The drive sprockets 178 and 180 each are fixed to the drive shaft 182. The tracking sprocket 184 also may be keyed to the drive shaft 182. The tracking sprocket 184 is positioned laterally on the drive shaft 182 by collars (only one collar being shown in FIG. 15 and designated by the reference numeral 183) in such a manner that the tracking sprocket 184 is disposed and maintained at a fixed position laterally on the drive shaft 182.

As shown in FIG. 2 and in an assembled position of the link assemblies 12 to form the conveyor belt 10, the adjacent forward and rearward shaft projections 50 and 52 cooperate to form a serious of spaced apart ridges 186, four ridges 186 being shown in FIG. 2 and designated therein by the reference numerals 186a, 186b, 186c and 186d. Each of the ridges 186 projects a distance upwardly and outwardly from the lower surface 24 of one of the link assemblies 12 thereby forming a groove 188 generally between each pair of the ridges 186, three grooves 188 being shown in FIG. 2 and designated therein by the reference numerals 188a, 188b and 188c. Each space between pairs of ridges 186 forming the groove 188 is sized to receive a tooth 179 or 181 on the drive sprocket 178 or 180. The teeth 179 and 181 on the drive sprockets 178 and 180 alternatively are disposed in the grooves 188 and engage the ridges 186 for drivingly moving the conveyor belt 10. The conveyor belt 10 can expand laterally during the operation over the drive sprockets 178 and 180 with the teeth 179 and 180 traveling with the groove 188, thereby allowing for belt growth in width due to thermal and moisture variations.

A tracking sprocket groove 192 is formed in the lower surface 24 of each of the link assemblies 12, as shown in FIG. 2. Each tracking sprocket groove 192 extends generally between the forward end 14 and the rearward 16 of each of the link assemblies 12. The tracking sprocket groove 194 forms a left engaging surface 194 extending generally between the forward end and the rearward end 16 of each of the link assemblies 12 and a right engaging surface 196 extending generally between the forward 14 and the rearward end 16 of each of the link assemblies 12.

In an assembled position of the link assemblies 12 the tracking sprocket grooves 192 in the link assemblies 12 are aligned and the central shaft projections 70 are spaced apart generally along the groove formed by the tracking sprocket grooves 192. Each of the tracking sprocket grooves 192 is sized to receive a tooth on the tracking sprocket 194 such that the tooth 194 is disposed in the groove 188 and confined therein by the left engaging surface 194 and the right engaging surface 196, the left and right engaging surfaces 194 and 196 engaging opposite sides of the tooth disposed in the groove 188. The engagement between the teeth 185 of the tracking sprocket 184 and the left and right engaging surfaces 194 and 196 cooperate to enable the tracking sprocket 184 to maintain the lateral position of the conveyor belt during the operation thereof. The teeth 185 on the tracking sprocket 184 alternatively are disposed in one of the grooves 188 and engage one of the central shaft projections 70 so that the tracking sprocket 184 is rotated generally following the rotation of the drive sprockets 178 and 180.

The belt rib 44a (FIG. 2) disposed generally adjacent the first side 18 of each link assembly 12 extends from lower surface 24 a distance greater than the remaining belt ribs 44 for engaging the sprocket 180 and preventing the sprocket from moving along the drive shaft 182 beyond the first side 18 if the sprocket 180 become unfixed to the drive shaft 182. The belt 46a (FIG. 2) disposed generally adjacent the second side 20 of each link assembly 12 extends from the lower surface 24 a distance greater than the remaining belt ribs 46 for engaging the sprocket 178 and preventing the sprocket 178 from moving along the drive shaft 182 beyond the second side 20, if the sprocket 178 becomes unfixed to the drive shaft.

Shown in FIG. 18 is a portion of two link assemblies 12f and 12g which are constructed exactly like the link assemblies 12 described before, except portions of the walls formed in the shaft projections 50g and 54f are rounded. The projection link openings 60f extend through each of the rearward shaft projections 54f of each of the link assemblies forming a forward wall 200 and a rearward wall 202, the terms "forward" and "rearward" being relative to a direction of travel 206 of the conveyor belt. The projection link openings 58g extend through each of the forward shaft projections 60g of each of the link assemblies forming a forward wall 208 and a rearward wall 210.

The edges of rearward wall 202 in each rearward shaft projection 54f where the projection link opening 60f intersects the sides of the rearward shaft projection 54f are rounded at 212 and 214. The edges of the forward wall 208 in each forward shaft projection 50g where the projection link opening 58g intersects the sides of the forward shaft projection 50g are rounded at 216 and 218. The rounding of the edges at 212, 214, 216 and 218 facilitates the forming of the link shaft 30 in the sine wave like form as described in Applicant's co-pending application referred to before.

Shown in FIG. 19 are two modified link assemblies 12k and 12l. The link assembly 12k includes two end modules 220 and 222 and three intermediate modules 224, 226 and 228. The link assembly 12l includes two end modules 230 and 232 and three intermediate modules 234, 236 and 238. The ends of each of the modules 220, 222, 224, 226, 228, 230, 232, 234, 236 and 238, which are adjacent the end of another module 220, 222, 224, 226, 228, 230, 232, 234, 236 and/or 238 are angled in a manner like the modules 78, 80 and 82 described in detail before. Each module 220, 222, 224, 226, 228, 230, 232, 234, 236 and 238 is sized so that the adjoining edges between the modules 220, 222, 224, 226 and 228 in the link assembly 12k are offset with respect to the adjoining edges between the modules 230, 232, 234, 236 and 238 in the link assembly 12l. The offsetting of these adjoining edges enhances the overall strength of the conveyor belt.

Changes may be made in the construction and operation of the various elements and components described herein and changes may be made in the steps or sequence of steps of the methods described herein without departing from the spirit and scope of the invention as defined in the following claims.

What is claimed is:

1. Flight link means formed of a plastic or ceramic material for connecting adjacently disposed link assemblies of a conveyor belt, the flight link means comprising:

a flight link having an upper surface, a lower surface, a first side and a second side, a forward face and a rearward face, and a forward end and a rearward end;

forward shaft projection means formed on the forward end of the flight link adjacent the forward face thereof for connecting the forward end of the flight link to an adjacently disposed link assembly;

rearward shaft projection means formed on the rearward end of the flight link adjacent to the rearward face thereof for connecting the rearward end of the flight link to an adjacently disposed link assembly;

a flight extending from the upper surface of the flight link a distance generally above the upper surface of the flight link and terminating with an upper end thereof; and wherein the forward face of the flight link generally near a lower end thereof is formed on a radius so as to provide the forward face of the flight link with a concave surface extending from about the forward shaft projection means towards the upper end of the flight.

2. The flight link means of claim 1 wherein the rearward face of the flight link generally near a lower end thereof is formed on a radius so as to provide the rearward face of the flight link with a concave surface extending from about the rearward shaft projection means towards the upper end of the flight.

3. Flight link means interposed between adjacent link assemblies of a conveyor belt for connecting adjacently disposed link assemblies of a conveyor belt; the flight link means comprising:

a flight link constructed of a plastic or ceramic material and having an upper surface, a lower surface, a first side, a second side, a forward face, a rearward face, a forward end and a rearward end;

forward shaft projection means formed on the forward end of the flight link adjacent the forward face thereof for connecting the forward end of the flight link to an adjacently disposed link assembly;

rearward shaft projection means formed on the rearward end of the flight link adjacent the rearward face of the flight link for connecting the rearward end of the flight link to an adjacently disposed link assembly, the interconnection of the link assemblies to the links via the forward shaft projection means and the rearward shaft projection means providing the conveyor belt with a substantially uniform surface substantially free of knife edges as the conveyor belt is moved from a substantially horizontal position in a vertical direction; and a flight extending from the upper surface of the flight link a distance generally above the upper surface of the flight link and terminating with an upper end thereof, a portion of the forward face of the flight link generally near a lower end thereof being formed on a radius so that at least a portion of the forward face of the flight link is provided with a concave surface extending from about the forward shaft projection means and a portion of the rearward face of the flight link generally near a lower end thereof being formed on a radius so that at least a portion of the rearward face of the flight link is provided with a concave surface extending from about the rearward shaft projection means.

* * * * *

UNITED STATES PATENT AND TRADEMARK OFFICE
CERTIFICATE OF CORRECTION

PATENT NO. : 5,413,211
DATED : May 9, 1995
INVENTOR(S) : William G. Faulkner

It is certified that error appears in the above-identified patent and that said Letters Patent is hereby corrected as shown below:

Title page, showing an illustrative figure, should be deleted and substititute therefor the attached title page.

Signed and Sealed this

Twenty-seventh Day of February, 1996

*Attest:*

BRUCE LEHMAN

*Attesting Officer*     *Commissioner of Patents and Trademarks*

United States Patent [19]

Faulkner

[11] Patent Number: 5,413,211
[45] Date of Patent: May 9, 1995

[54] CONVEYOR INCOPORATING CURVED SURFACE FLIGHT LINKS

[75] Inventor: William G. Faulkner, Oklahoma City, Okla.

[73] Assignees: William Faulkner; Marie-Francoise Bigot Faulkner, both of Oklahoma City, Okla.

[21] Appl. No.: 289,959

[22] Filed: Aug. 12, 1994

Related U.S. Application Data

[60] Continuation of Ser. No. 117,566, Sep. 3, 1993, abandoned, which is a continuation of Ser. No. 982,816, Nov. 30, 1992, abandoned, which is a continuation of Ser. No. 660,977, Feb. 26, 1991, abandoned, which is a division of Ser. No. 366,773, Jun. 19, 1989, Pat. No. 5,020,656, which is a continuation-in-part of Ser. No. 220,601, Jul. 18, 1988, Pat. No. 4,972,942.

[51] Int. Cl.⁶ ............................................. B65G 15/42
[52] U.S. Cl. ................................. 198/690.2; 198/853
[58] Field of Search ........................ 198/690.2, 852, 853

[56] References Cited

U.S. PATENT DOCUMENTS

| | | |
|---|---|---|
| D. 291,--- | 9/1987 | Lapeyre et al. |
| 912,000 | 2/1909 | McPherson |
| 1,027,352 | 5/1912 | Morse |
| 1,558,719 | 10/1925 | Sturtevant |
| 1,561,676 | 11/1925 | Wertman |
| 1,562,843 | 11/1925 | Belcher |
| 1,564,798 | 12/1925 | Sturtevant |
| 1,565,760 | 12/1925 | Sutherland |
| 1,569,234 | 1/1926 | Moller |
| 1,638,388 | 8/1927 | Belcher |
| 1,649,845 | 11/1927 | Moller |
| 1,678,450 | 7/1928 | Sturtevant |
| 2,045,646 | 6/1936 | Harris |
| 2,413,843 | 1/1947 | Perry |
| 2,602,344 | 7/1952 | Bremer |
| 2,653,485 | 9/1953 | MacArthur |
| 2,667,791 | 2/1954 | Bremer |
| 3,159,267 | 12/1964 | Jeffrey |
| 3,261,451 | 7/1966 | Roinestad |
| 3,269,526 | 8/1966 | Imse et al. |
| 3,348,680 | 10/1967 | Mathews et al. |
| 3,724,285 | 4/1973 | Lapeyre |
| 3,939,964 | 2/1976 | Poerink |
| 4,222,483 | 9/1980 | Wootton et al. |
| 4,449,960 | 5/1984 | van der Lely |
| 4,507,106 | 3/1985 | Cole, Jr. |
| 4,581,001 | 4/1986 | Rattunde et al. |
| 4,729,469 | 3/1988 | Lapeyre et al. |
| 4,741,431 | 5/1988 | Whitehead |
| 4,832,183 | 5/1989 | Lapeyre |
| 4,832,187 | 5/1989 | Lapeyre |
| 4,858,753 | 8/1989 | Hodlewsky |
| 4,865,183 | 9/1989 | Hodlewsky et al. |
| 4,925,013 | 5/1990 | Lapeyre |
| 5,165,514 | 11/1992 | Faulkner ........................ 198/690.2 |

FOREIGN PATENT DOCUMENTS

| | | |
|---|---|---|
| 0032797 | 7/1981 | European Pat. Off. |
| 0288409 | 10/1988 | European Pat. Off. |
| 0380201 | 1/1990 | European Pat. Off. |
| 1066905 | 4/1967 | United Kingdom |
| 1475693 | 6/1977 | United Kingdom |
| 9008080 | 7/1909 | WIPO |

Primary Examiner—Joseph E. Valenza
Attorney, Agent, or Firm—Dunlap & Codding

[57] ABSTRACT

The present invention relates generally to conveyor belts and, more particularly, but not by way of limitation, to a conveyor belt having ribs formed on a lower surface thereof for moving particles generally outwardly toward the first and the second sides of link assemblies which form the conveyor belt, and to a conveyor belt constructed of modules shaped so that the interconnections between modules are offset between each link assembly and adjacent link assemblies, and a flight link having curved portions formed the faces thereof so product slides on the surfaces rather than being toppled and a conveyor belt with a tracking product groove to substantially limit lateral movement of the conveyor belt.

3 Claims, 8 Drawing Sheets

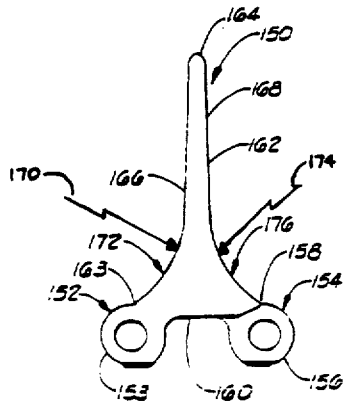

UNITED STATES PATENT AND TRADEMARK OFFICE
CERTIFICATE OF CORRECTION

PATENT NO. : 5,413,211          Page 3 of 11

DATED     : May 9, 1995

INVENTOR(S) : Faulkner

It is certified that error appears in the above-identified patent and that said Letters Patent is hereby corrected as shown below:

Cover page, "Related U.S. Application Data", line 5, please delete "Jun. 19, 1989" and substitute therefor -- Jun. 14, 1989 --.

In the drawings, Figure 2, please add drawing element numeral -- 74 -- as indicated below.

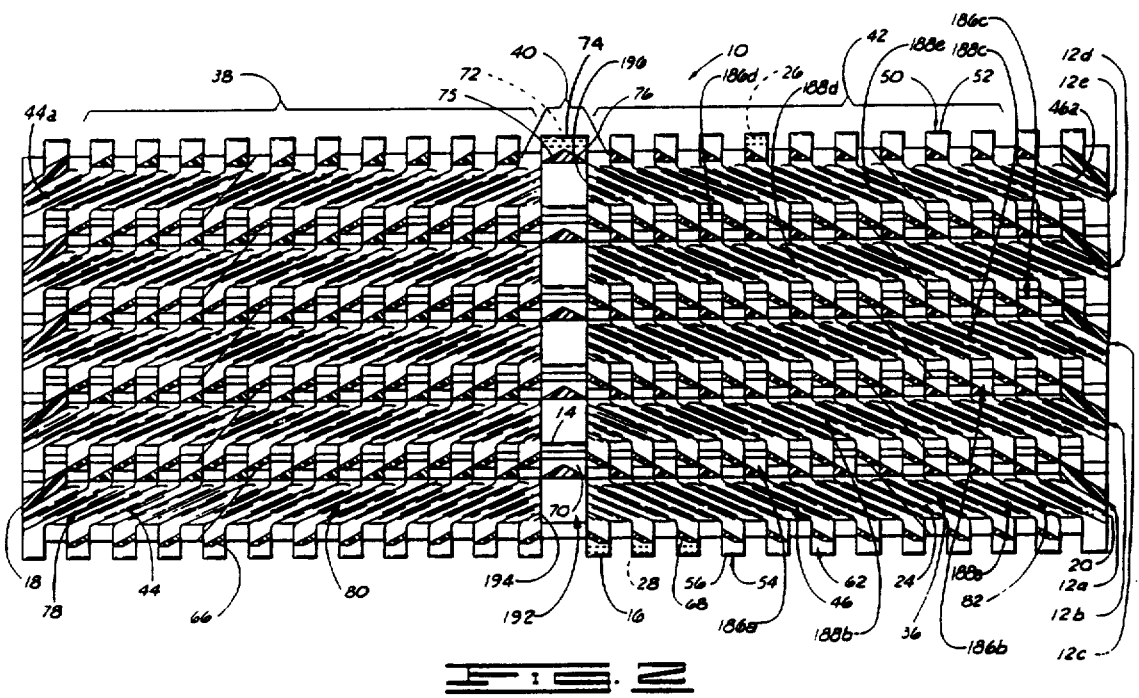

FIG. 2

UNITED STATES PATENT AND TRADEMARK OFFICE
CERTIFICATE OF CORRECTION

PATENT NO. : 5,413,211

DATED : May 9, 1995

INVENTOR(S) : Faulkner

It is certified that error appears in the above-identified patent and that said Letters Patent is hereby corrected as shown below:

In the drawings, Figure 11, please delete drawing element numerals "140, 150, 152, 154, 160" and substitute therefor -- 132, 134, 136, 138, 140 -- as indicated below.

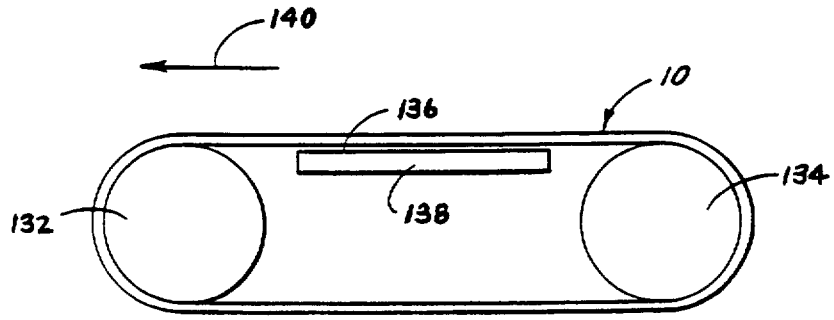

FIG. 11

UNITED STATES PATENT AND TRADEMARK OFFICE
CERTIFICATE OF CORRECTION

PATENT NO. : 5,413,211

DATED : May 9, 1995

INVENTOR(S) : Faulkner

It is certified that error appears in the above-identified patent and that said Letters Patent is hereby corrected as shown below:

In the drawings, Figure 13, please add drawing element numerals -- 170 and 174 -- as indicated below.

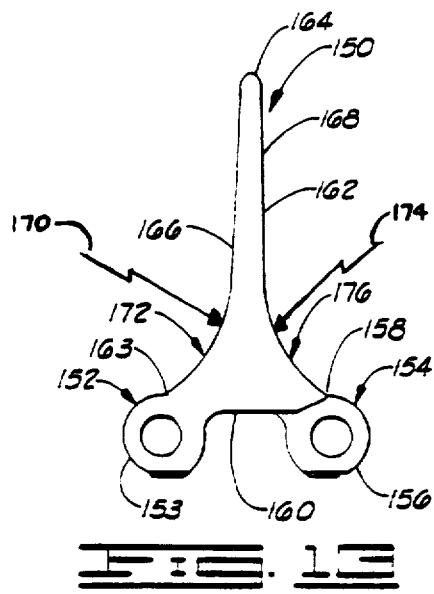

UNITED STATES PATENT AND TRADEMARK OFFICE
CERTIFICATE OF CORRECTION

PATENT NO. : 5,413,211

DATED : May 9, 1995

INVENTOR(S) : Faulkner

It is certified that error appears in the above-identified patent and that said Letters Patent is hereby corrected as shown below:

In the drawings, Figure 15, please add drawing element numeral -- 183 -- as indicated below.

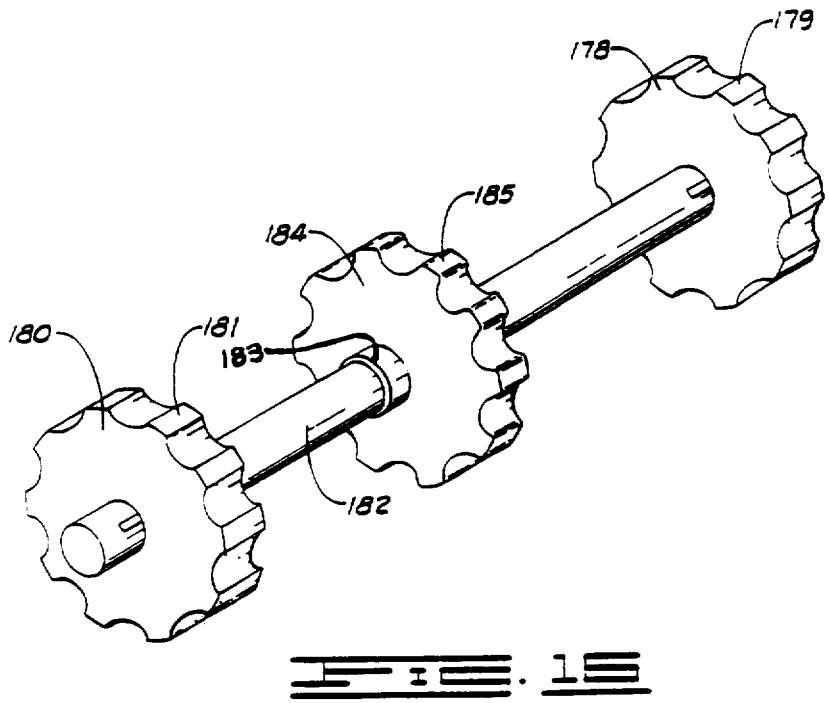

FIG. 15

UNITED STATES PATENT AND TRADEMARK OFFICE
CERTIFICATE OF CORRECTION

PATENT NO. : 5,413,211

DATED : May 9, 1995

INVENTOR(S) : Faulkner

It is certified that error appears in the above-identified patent and that said Letters Patent is hereby corrected as shown below:

Column 1, line 35, please delete "1 ink" and substitute therefor -- link --.

Column 1, line 35, please delete "formed" and substitute therefor -- form --.

Column 2, line 19, please delete "operative" and substitute therefor -- operatively --.

Column 2, line 63, please delete "1 ink" and substitute therefor -- link --.

Column 2, line 64, please delete "1 ink" and substitute therefor -- link --.

Column 3, lines 44-45, please delete "lower surface 22" and substitute therefor -- lower surface 24 --.

Column 3, line 47, please delete "link assemblies 42" and substitute therefor -- link assemblies 12 --.

Column 3, line 57, please delete "forward end 16" and substitute therefor -- forward end 14 --.

Column 4, line 21, please delete "projections 54" and substitute therefor -- projection 54 --.

Column 4, line 56, please delete "first" and substitute therefor -- second --.

UNITED STATES PATENT AND TRADEMARK OFFICE
CERTIFICATE OF CORRECTION

PATENT NO. : 5,413,211

DATED : May 9, 1995

INVENTOR(S) : Faulkner

It is certified that error appears in the above-identified patent and that said Letters Patent is hereby corrected as shown below:

Column 5, line 13, please delete "projection 70" and substitute therefor -- projections 70 --.

Column 5, line 45, after "position" please delete "to".

Column 5, lines 49-50, please delete "link shaft 30" and substitute therefor -- link shafts 30 --.

Column 5, line 66, please delete "first central ribs 74" and substitute therefor -- first central ribs 75 --.

Column 6, line 14, please delete "cooperates" and substitute therefor -- cooperate --.

Column 6, line 49, please delete "80" and substitute therefor -- 82 --.

Column 7, line 38, please delete "0,039" and substitute therefor -- 0.039 --.

Column 7, line 40, please delete "+" and substitute therefor -- ÷ --.

Column 8, line 10, please delete "0,150" and substitute therefor -- 0.150 --.

Column 8, line 12, please delete "/" and substitute therefor -- . --.

UNITED STATES PATENT AND TRADEMARK OFFICE
CERTIFICATE OF CORRECTION

PATENT NO. : 5,413,211
DATED : May 9, 1995
INVENTOR(S) : Faulkner

It is certified that error appears in the above-identified patent and that said Letters Patent is hereby corrected as shown below:

Column 8, line 15, please delete "+" and substitute therefor -- ÷ --.

Column 8, line 27, after "30" please delete ",".

Column 8, line 33, please delete "matter" and substitute therefor -- manner --.

Column 8, line 47, please delete the word "a".

Column 8, lines 56-57, please delete "sprockets 140 and 150" and substitute therefor -- sprockets 132 and 134 --.

Column 8, line 58, please delete "support surface 152 of a support 154" and substitute therefor -- support surface 136 of a support 138 --.

Column 8, line 61, please delete "support surface 152" and substitute therefor -- support surface 136 --.

Column 8, line 63, please delete "direction 160" and substitute therefor -- direction 140 --.

Column 8, line 64, please delete "support surface 152" and substitute therefor -- support surface 136 --.

Column 8, line 64, please delete "ribs 68 and 70" and substitute therefor -- ribs 66 and 68 --.

UNITED STATES PATENT AND TRADEMARK OFFICE
CERTIFICATE OF CORRECTION

PATENT NO. : 5,413,211

DATED : May 9, 1995

INVENTOR(S) : Faulkner

It is certified that error appears in the above-identified patent and that said Letters Patent is hereby corrected as shown below:

Column 8, lines 66-67, please delete "support surface 152" and substitute therefor -- support surface 136 --.

Column 8, line 68, please delete "support surface 152" and substitute therefor -- support surface 136 --.

Column 9, lines 2-3, please delete "support surface 152" and substitute therefor -- support surface 136 --.

Column 9, lines 4-5, please delete "surface 150" and substitute therefor -- surface 136 --.

Column 9, line 63, please delete "include" and substitute therefor -- inclined --.

Column 10, line 15, please delete "nI" and substitute therefor -- In --.

Column 10, line 20, please delete "158 or".

Column 10, line 41, please delete "drive sprocket 179" and substitute therefor -- drive sprocket 178 --.

Column 11, line 2, please delete "serious" and substitute therefor -- series --.

Column 11, line 19, please delete "180" and substitute therefor -- 181 --.

UNITED STATES PATENT AND TRADEMARK OFFICE
CERTIFICATE OF CORRECTION

PATENT NO. : 5,413,211

DATED : May 9, 1995

INVENTOR(S) : Faulkner

It is certified that error appears in the above-identified patent and that said Letters Patent is hereby corrected as shown below:

Column 11, line 26, please delete "rearward 16" and substitute therefor -- rearward end 16 --.

Column 11, line 27, please delete "sprocket groove 194" and substitute therefor -- sprocket groove 192 --.

Column 11, line 31, please delete "forward 14" and substitute therefor -- forward end 14 --.

Column 11, line 39, please delete "tracking sprocket 194" and substitute therefor -- tracking sprocket 184 --.

Column 11, line 39, please delete "tooth 194" and substitute therefor -- tooth 185 --.

Column 11, line 60, please delete "if" and substitute therefor -- of --.

Column 11, line 61, please delete "belt 46a" and substitute therefor -- belt ribs 46a --.

Column 12, line 12, please delete "60g" and substitute therefor -- 50g --.

Column 13, line 17, please delete "belt;" and substitute therefor -- belt, --.